(12) United States Patent
Komiyama (10) Patent No.: US 11,437,671 B2
(45) Date of Patent: Sep. 6, 2022

(54) BATTERY PACK AIR COOLING SYSTEM AND VEHICLE

(71) Applicant: TOYOTA JIDOSHA KABUSHIKI KAISHA, Toyota (JP)

(72) Inventor: Keita Komiyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 75 days.

(21) Appl. No.: 17/018,375

(22) Filed: Sep. 11, 2020

(65) Prior Publication Data

US 2021/0091431 A1 Mar. 25, 2021

(30) Foreign Application Priority Data

Sep. 25, 2019 (JP) .............................. JP2019-174237

(51) Int. Cl.
| | |
|---|---|
| *H01M 10/6563* | (2014.01) |
| *H01M 10/48* | (2006.01) |
| *H01M 10/625* | (2014.01) |
| *H01M 10/633* | (2014.01) |
| *H01M 10/613* | (2014.01) |
| *H01M 50/20* | (2021.01) |

(52) U.S. Cl.
CPC ..... *H01M 10/6563* (2015.04); *H01M 10/486* (2013.01); *H01M 10/613* (2015.04); *H01M 10/625* (2015.04); *H01M 10/633* (2015.04); *H01M 50/20* (2021.01); *H01M 2220/20* (2013.01)

(58) Field of Classification Search
None
See application file for complete search history.

(56) References Cited

U.S. PATENT DOCUMENTS

2016/0362018 A1* 12/2016 Tanaka .............. H01M 10/6563

FOREIGN PATENT DOCUMENTS

JP 2014-148245 A 8/2014

* cited by examiner

*Primary Examiner* — Karie O'Neill Apicella
(74) *Attorney, Agent, or Firm* — Oliff PLC (57) ABSTRACT

A controller of a battery pack air cooling system is configured to calculate a degradation amount of each target battery based on integrated temperature information of each target battery that makes up a battery pack, calculate degradation variations in the battery pack based on the degradation amount of each target battery, when it is determined that a detected battery temperature of any one of the target batteries is higher than an outside air temperature, cause an air sending device to send outside air to the battery pack, and, when it is determined that the detected battery temperature is lower than or equal to the detected outside air temperature and it is determined that the degradation variations in the battery pack are greater than or equal to a threshold, cause an air sending device to send outside air to the battery pack.

7 Claims, 9 Drawing Sheets

FIG. 11 the air inlet with the outside air temperature sensor. The degradation amount calculation unit is configured to calculate a degradation amount of each target battery based on the integrated temperature information. The degradation variations calculation unit is configured to calculate degradation variations in the battery pack based on the degradation amount of each target battery, calculated by the degradation amount calculation unit. The first determination unit is configured to determine whether the detected battery temperature is higher than the detected outside air temperature. The second determination unit is configured to determine whether the degradation variations in the battery pack, calculated by the degradation variations calculation unit, are greater than or equal to a predetermined threshold. The first air sending unit is configured to, when the first determination unit determines that the detected battery temperature is higher than the detected outside air temperature, cause the air sending device to send outside air to the battery pack. The second air sending unit is configured to, when the first determination unit determines that the detected battery temperature is lower than or equal to the detected outside air temperature and the second determination unit determines that the degradation variations in the battery pack are greater than or equal to the threshold, cause the air sending device to send outside air to the battery pack.

With the battery pack air cooling system suggested here, a difference in degradation amount among the secondary batteries is reduced within an allowable range of degradation amount, so degradation variations in the battery pack are suppressed.

In the battery pack air cooling system suggested here, the storage unit may be configured to prestore a rate of degradation at each value of the battery temperature. The degradation amount calculation unit may be configured to calculate a temperature degradation amount at each value of the battery temperature for each target battery by multiplying the rate of degradation by the integrated time at each value of the battery temperature. The degradation amount calculation unit may be configured to determine a value obtained by adding the temperature degradation amounts at the values of the battery temperature for each target battery as the degradation amount of each target battery.

In the battery pack air cooling system suggested here, the controller may include an estimated degradation amount calculation unit configured to, where an amount of increase in degradation amount of each target battery in a case where outside air is sent to the battery pack during a lapse of a predetermined time from a current time point is a degradation facilitation amount, calculate an estimated degradation amount obtained by adding the degradation amount of each target battery, calculated by the degradation amount calculation unit, and the degradation facilitation amount for each target battery; and a third determination unit configured to determine whether the estimated degradation amount of each target battery, calculated by the estimated degradation amount calculation unit, is less than a predetermined assumed degradation amount. The second air sending unit may be configured to, when the first determination unit determines that the detected battery temperature is lower than or equal to the detected outside air temperature, the second determination unit determines that the degradation variations in the battery pack are greater than or equal to the threshold, and the third determination unit determines that the estimated degradation amount of each target battery is less than the assumed degradation amount, cause the air sending device to send outside air to the battery pack.

In the battery pack air cooling system suggested here, the estimated degradation amount calculation unit may be configured to calculate the degradation facilitation amount of each target battery based on the rate of degradation at each value of the battery temperature, and the detected outside air temperature.

In the battery pack air cooling system suggested here, the degradation variations calculation unit may be configured to define a difference between the degradation amount of the target battery having the greatest degradation amount and the degradation amount of the target battery having the least degradation amount of the degradation amounts of the target batteries, calculated by the degradation amount calculation unit, as the degradation variations in the battery pack.

In the battery pack air cooling system suggested here, the target batteries may include the secondary battery located at each of both end portions of the battery pack and the secondary battery located at a center portion of the battery pack.

A vehicle suggested here may include any one of the above-described battery pack air cooling systems. With this vehicle, a vehicle that is able to suppress degradation variations in the battery pack is provided.

BRIEF DESCRIPTION OF THE DRAWINGS

Features, advantages, and technical and industrial significance of exemplary embodiments will be described below with reference to the accompanying drawings, in which like signs denote like elements, and wherein.

DETAILED DESCRIPTION OF EMBODIMENTS

Hereinafter, embodiments of a vehicle including a battery pack air cooling system disclosed here will be described.

The embodiments that will be described below are, of course, not intended to limit the disclosure. The disclosure is not limited to the embodiments that will be described below unless otherwise specified.

First Embodiment

Figure 1:
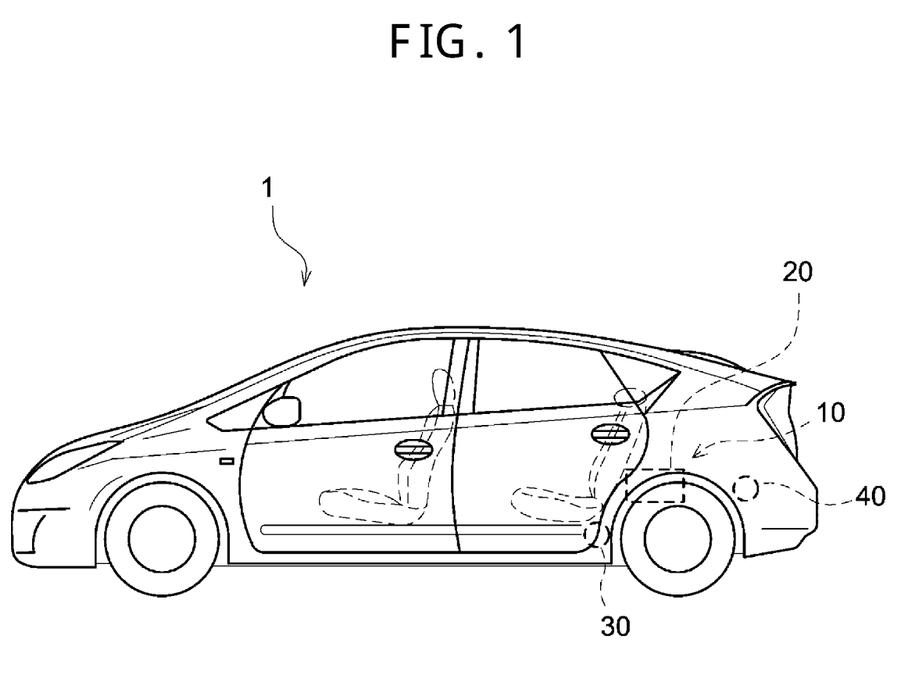
FIG. 1 is a schematic view of a vehicle according to a first embodiment.

FIG. 1 is a schematic view of a vehicle 1 according to a first embodiment. As shown in FIG. 1, the vehicle 1 according to the present embodiment is an electrically-powered vehicle. The "electrically-powered vehicle" is a vehicle that travels or that is assisted in traveling by using the driving force of a motor driven by electric power output from a secondary battery. Examples of the "electrically-powered vehicle" include a hybrid vehicle, a plug-in hybrid vehicle, and an electric vehicle. When the electrically-powered vehicle travels, the electrically-powered vehicle travels in hybrid vehicle (HV) mode or in electric vehicle (EV) mode. In HV mode, the electrically-powered vehicle brings an engine into operation and travels by using both a motor and the engine. In EV mode, the electrically-powered vehicle travels by using only the driving force of the motor. Hybrid vehicles, including plug-in hybrid vehicles, are able to travel in HV mode and EV mode. Electric vehicles not equipped with an engine are able to travel in EV mode.

Figure 2:
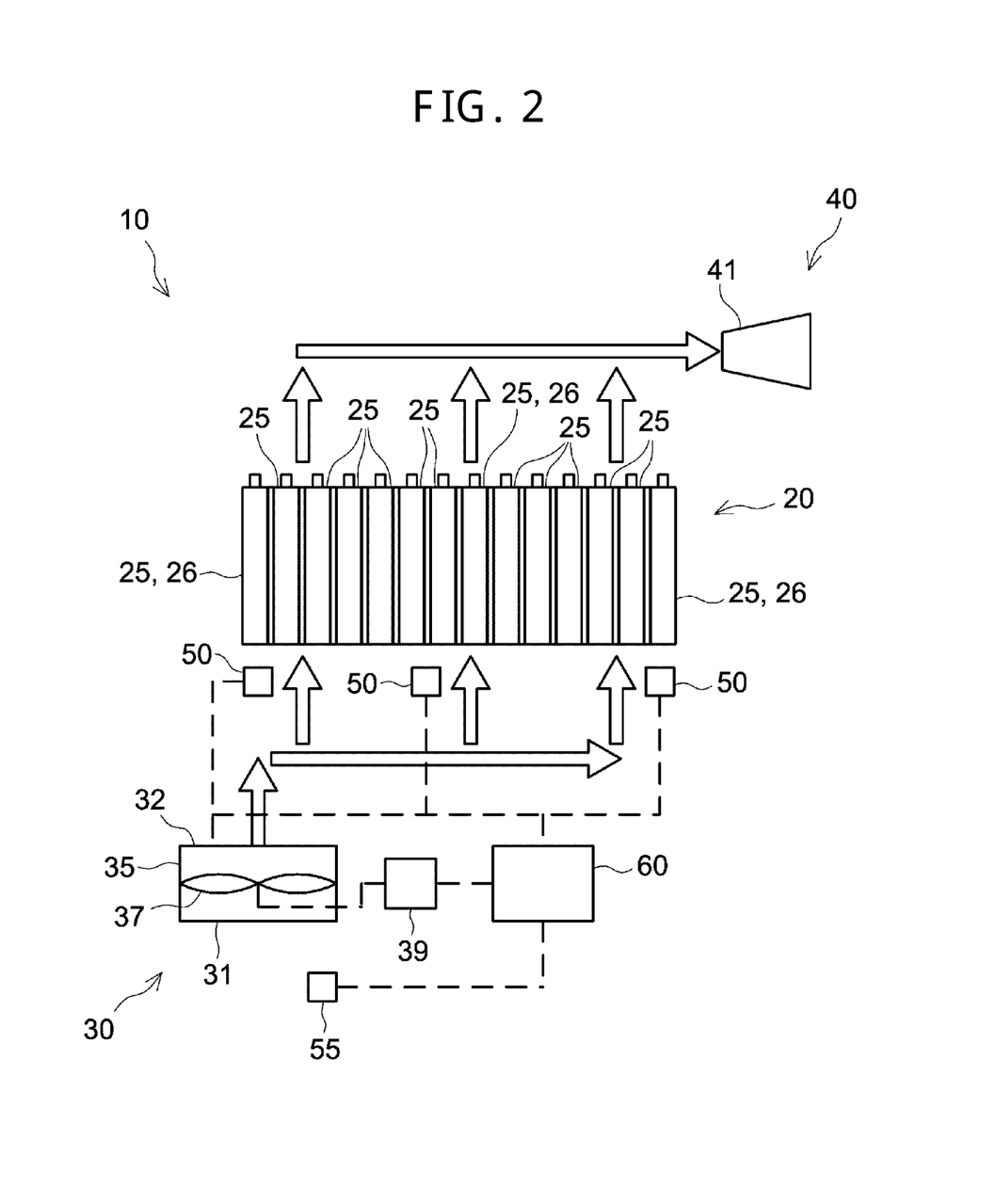
FIG. 2 is a conceptual view that shows a battery pack air cooling system.

The vehicle 1 includes a battery pack air cooling system 10. FIG. 2 is a conceptual view that shows the battery pack air cooling system 10. In FIG. 2, the arrows represent flows of outside air, and the dashed lines represent electrical connections. The battery pack air cooling system 10 suppresses the degradation and degradation variations of secondary batteries 25 that make up the battery pack 20 by sending outside air to the battery pack 20. The battery pack 20 serves as a driving source of the vehicle 1. As shown in FIG. 2, the battery pack air cooling system 10 includes the battery pack 20, an air sending device 30, battery temperature sensors 50, an outside air temperature sensor 55, and a controller 60.

The battery pack 20 is made up of a plurality of the assembled secondary batteries 25. The secondary batteries 25 are electric power storage elements configured to be chargeable and dischargeable. Examples of the secondary batteries 25 include a lithium ion battery and a nickel-metal hydride battery. A lithium ion secondary battery is a secondary battery that uses lithium as a charge carrier. A lithium ion secondary battery may be a lithium ion secondary battery of which an electrolyte is liquid or may be a so-called all-solid battery using a solid electrolyte.

In the present embodiment, the battery pack 20 has such a structure that the secondary batteries 25 are arranged in a single straight line. However, the structure of the battery pack 20 is not limited. For example, the battery pack 20 may have such a structure that the secondary batteries 25 are arranged in multiple straight lines. Alternatively, the secondary batteries 25 that make up the battery pack 20 are not arranged in a straight line or straight lines, and may be arranged in a curved line or curved lines.

The air sending device 30 sends outside air to the battery pack 20. Outside air means air outside the battery pack 20 and, in the present embodiment, specifically means air outside the vehicle 1.

The air sending device 30 includes an air inlet 31, an air outlet 32, an air passage 35, a fan 37, and a motor 39. The air inlet 31 is a port through which outside air is introduced. The position of the air inlet 31 is not limited. The air inlet 31 is, for example, disposed so as to open downward from the bottom of the vehicle 1. Outside air under the vehicle 1 can be taken in through the air inlet 31. The air outlet 32 is a port through which, when outside air introduced from the air inlet 31 is sent to the battery pack 20, the outside air passes. The air outlet 32 is, for example, disposed below the battery pack 20 and open toward the battery pack 20. Here, outside air having passed through the air outlet 32 is sent toward the lower side of the battery pack 20. The position of the air outlet 32 is not limited as long as the air outlet 32 is able to send outside air to the battery pack 20.

The air passage 35 connects the air inlet 31 and the air outlet 32. Outside air introduced from the air inlet 31 passes through the air passage 35 and reaches the air outlet 32. The fan 37 is provided halfway in the air passage 35 and disposed between the air inlet 31 and the air outlet 32. The motor 39 is connected to the fan 37.

In the present embodiment, when the motor 39 is driven and the fan 37 rotates, outside air is taken in through the air inlet 31. Outside air taken in from the air inlet 31 passes through the air passage 35 and reaches the air outlet 32. Outside air having passed through the air outlet 32 is sent from below the battery pack 20 toward the lower side of the battery pack 20. The outside air flows from the lower side of the battery pack 20 toward the upper side inside the battery pack 20 and flows to above the battery pack 20.

In the present embodiment, an exhaust air duct 40 having an exhaust air outlet 41 is provided above the battery pack 20. Therefore, outside air having reached above the battery pack 20 passes through the exhaust air outlet 41 and is emitted via the exhaust air duct 40.

The battery temperature sensors 50 detect the temperatures (hereinafter, also referred to as battery temperatures) of a plurality of the secondary batteries 25 that make up the battery pack 20. The type, position, and the like, of each of the battery temperature sensors 50 are not limited. Each battery temperature sensor 50, for example, detects the temperature of the surface of the secondary battery 25 and may be of a contact type or a noncontact type. The battery temperature sensor 50 may be attached to the secondary battery 25.

In the present embodiment, the secondary batteries 25 of which the battery temperatures are to be detected by the battery temperature sensors 50 may be all the secondary batteries 25 that make up the battery pack 20 or may be not all the secondary batteries 25. In other words, the battery temperatures of all the secondary batteries 25 that make up the battery pack 20 do not need to be detected. In the following description, the secondary batteries 25 of which the battery temperatures are to be detected by the battery temperature sensors 50 are referred to as target batteries 26. The number of the target batteries 26 is less than or equal to the number of the secondary batteries 25 that make up the battery pack 20. Here, the number of the target batteries 26 is three. For example, of the secondary batteries 25 that make up the battery pack 20, the secondary battery 25 located at each of both end portions of the battery pack 20 and the secondary battery 25 located at the center portion of the battery pack 20 are set as the target batteries 26.

The number of the battery temperature sensors 50 is not limited. For example, when the single battery temperature sensor 50 is able to detect the battery temperatures of a plurality of the target batteries 26, the number of the battery temperature sensors 50 is less than the number of the target batteries 26. When the single battery temperature sensor 50 is able to detect the battery temperature of the single target battery 26, the number of the battery temperature sensors 50 is equal to the number of the target batteries 26. In FIG. 2, the three battery temperature sensors 50 are shown.

The outside air temperature sensor 55 detects the temperature (hereinafter, also referred to as outside air temperature) of outside air that is introduced from the air inlet 31 of the air sending device 30. In the present embodiment, the outside air temperature sensor 55 detects the outside air temperature of outside air under the vehicle 1. The type and position of the outside air temperature sensor 55 are not limited. For example, a sensor of the same type as the battery temperature sensor 50 may be employed as the outside air temperature sensor 55, or a sensor of a type different from the battery temperature sensor 50 may be employed as the outside air temperature sensor 55. The outside air temperature sensor 55 is, for example, disposed below the battery pack 20 and attached to a portion of the vehicle 1 near the air inlet 31 of the air sending device 30.

Next, the controller 60 will be described. The controller 60 executes various processes in the vehicle 1. In the present embodiment, the controller 60 executes a process of sending outside air to the battery pack 20. The controller 60 can be realized by, for example, one or multiple computers that are driven in accordance with a predetermined program. The controller 60 is, for example, a device called electronic control unit (ECU). Functions of the controller 60 are processed by cooperation of an arithmetic unit (also called processor, central processing unit (CPU), or micro-processing unit (MPU)) of the one or multiple computers that make up the controller 60 and a storage (such as a memory and a hard disk) with software. For example, components and processes of the controller 60 each can be implemented as a database storing data to be realized by the one or multiple computers in a predetermined format, a data structure, a processing module that executes predetermined arithmetic processing in accordance with a predetermined program, or the like, or part of any one of them.

Figure 3:
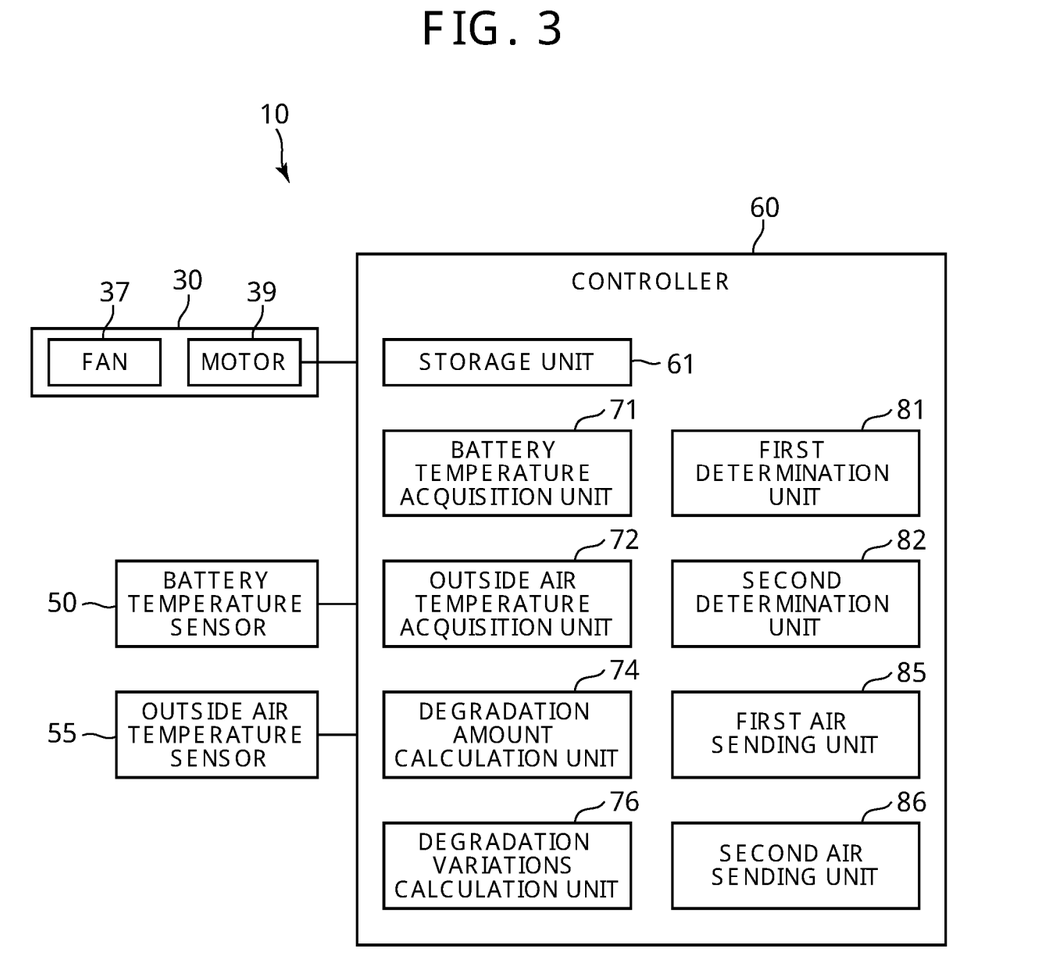
FIG. 3 is a block diagram of the battery pack air cooling system.

FIG. 3 is a block diagram of the battery pack air cooling system 10. As shown in FIG. 3, in the present embodiment, the controller 60 is communicably connected to the air sending device 30 (more specifically, the motor 39 that rotates the fan 37), the battery temperature sensors 50, and the outside air temperature sensor 55. The controller 60 controls the air sending device 30, the battery temperature sensors 50, and the outside air temperature sensor 55.

The controller 60 includes a storage unit 61, a battery temperature acquisition unit 71, an outside air temperature acquisition unit 72, a degradation amount calculation unit 74, and a degradation variations calculation unit 76. The controller 60 further includes a first determination unit 81, a second determination unit 82, a first air sending unit 85, and a second air sending unit 86. The units of the controller 60 may be implemented by software or may be implemented by hardware. The units of the controller 60 may be realized by one or multiple processors or may be embedded in a circuit or circuits. The units of the controller 60 will be described in detail later.

Figure 4:
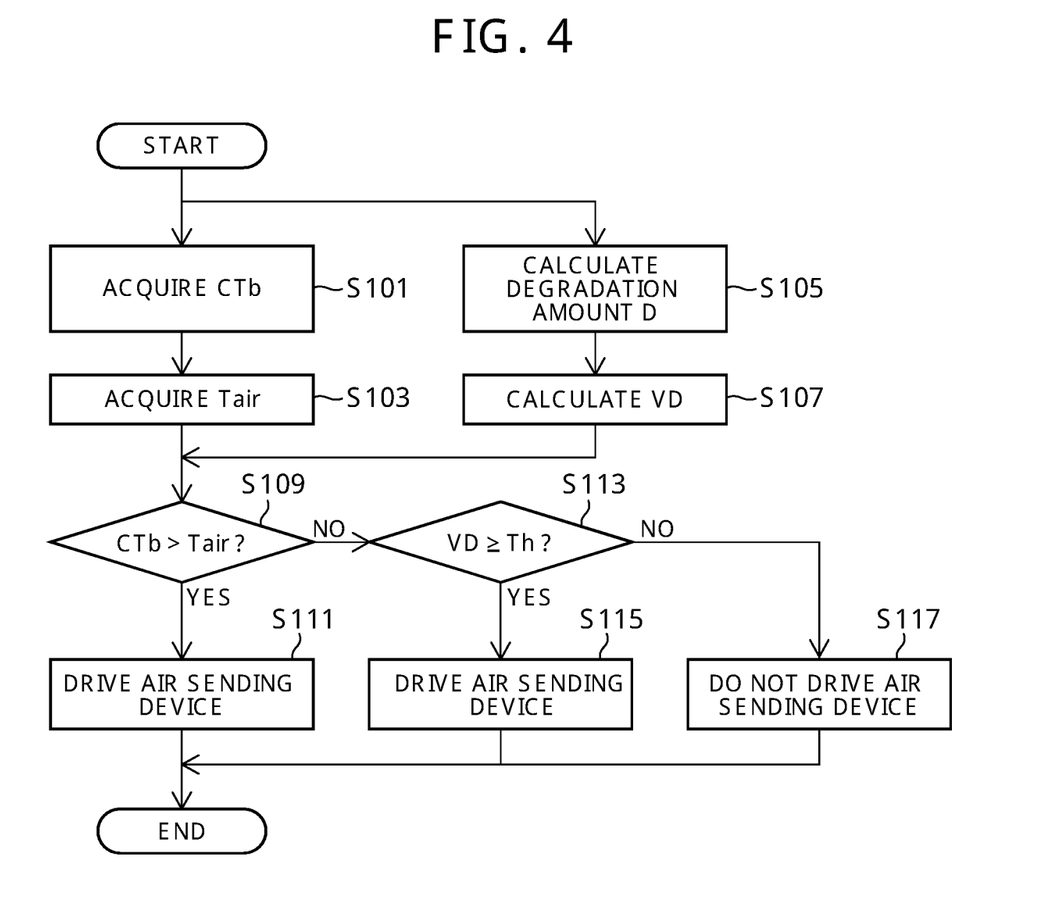
FIG. 4 is a flowchart that shows a procedure for sending outside air to a battery pack.

Next, a procedure for sending outside air to the battery pack 20 by the battery pack air cooling system 10 according to the present embodiment will be described with reference to the flowchart of FIG. 4. Here, while the vehicle 1 (see FIG. 1) is traveling, an interrupt process according to the flowchart of FIG. 4 is executed each time a predetermined time elapses, and outside air is sent to the battery pack 20 depending on the results of processing of the flowchart of FIG. 4. Although described in detail later, in the present embodiment, whether to send outside air to the battery pack 20 is determined depending on battery temperatures Tb of the target batteries 26 that make up the battery pack 20, an outside air temperature Tair, degradation amounts D of the target batteries 26, and degradation variations VD in the battery pack 20.

Initially, in step S101 of FIG. 4, the battery temperature acquisition unit 71 acquires battery temperatures CTb of the target batteries 26 of the secondary batteries 25 that make up the battery pack 20. Hereinafter, battery temperatures acquired in step S101 are referred to as detected battery temperatures CTb. In step S101, detected battery temperatures CTb may be acquired from all the secondary batteries 25 that make up the battery pack 20; however, because of reasons such as a reduction in calculation amount, detected battery temperatures CTb of the target batteries 26 of the secondary batteries 25 are detected. The target batteries 26 here are the secondary battery 25 located at each of both end portions of the battery pack 20 and the secondary battery 25 located at the center portion of the battery pack 20, of the secondary batteries 25 that make up the battery pack 20.

In the present embodiment, the battery temperature acquisition unit 71 acquires the detected battery temperatures CTb of the target batteries 26 from the battery temperature sensors 50. More specifically, the battery temperature acquisition unit 71 sends a battery temperature detection instruction signal to the battery temperature sensors 50 associated with the target batteries 26. The battery temperature sensor 50 having received the battery temperature detection instruction signal sends a signal indicating the detected battery temperature CTb of the associated target battery 26 to the battery temperature acquisition unit 71. As a result, the battery temperature acquisition unit 71 acquires the detected battery temperatures CTb of the target batteries 26. The detected battery temperatures CTb acquired by the battery temperature acquisition unit 71 are stored in the storage unit 61.

Subsequently, in step S103, the outside air temperature acquisition unit 72 acquires the outside air temperature Tair. Hereinafter, the outside air temperature acquired in step S103 is also referred to as detected outside air temperature Tair. In the present embodiment, the outside air temperature acquisition unit 72 acquires the outside air temperature Tair of outside air that is introduced into the air inlet 31 of the air sending device 30 from the outside air temperature sensor 55. More specifically, the outside air temperature acquisition unit 72 sends an outside air temperature detection instruction signal to the outside air temperature sensor 55. When the outside air temperature sensor 55 receives the outside air temperature detection instruction signal, the outside air temperature sensor 55 sends a signal indicating the outside air temperature Tair to the outside air temperature acquisition unit 72. As a result, the outside air temperature acquisition unit 72 acquires the outside air temperature Tair of outside air that is introduced into the air inlet 31. The detected outside air temperature Tair acquired by the outside air temperature acquisition unit 72 is stored in the storage unit 61.

In the present embodiment, as shown in FIG. 4, in parallel with execution of step S101 and step S103, step S105 and step S107 are sequentially executed. Step S105 and step S107 may be executed before step S101 and step S103 or may be executed after step S101 and step S103.

In step S105, the degradation amount calculation unit 74 calculates the degradation amount D of each of the target batteries 26. A degradation amount D is a numeric scale of a degree of degradation of the secondary battery 25. For example, when the degradation amount D is large, the associated secondary battery 25 is determined to be degraded; whereas, when the degradation amount D is small, the associated secondary battery 25 is determined to be not so degraded. In the present embodiment, the degradation amount calculation unit 74 calculates the degradation amount D of each of the target batteries 26 based on the battery temperature Tb of the target battery 26.

Figure 5:
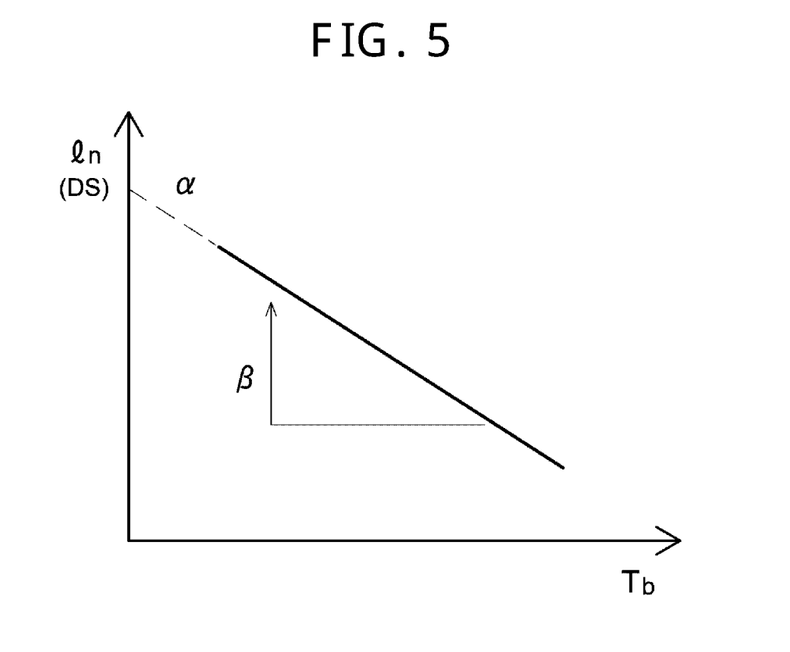
FIG. 5 is a graph that shows a rate of degradation of a secondary battery at each value of battery temperature.

FIG. 5 is a graph that shows a rate of degradation DS of the secondary battery 25 at each value of the battery temperature Tb. In FIG. 5, the ordinate axis represents the logarithm of a rate of degradation DS and is indicated by ln(DS). The abscissa axis represents battery temperature Tb. In the present embodiment, the degradation amount D of each of the target batteries 26 is calculated based on the rate of degradation DS at each value of the battery temperature Tb and integrated temperature information TInfo (see FIG. 6). Here, a rate of degradation DS at each value of the battery temperature Tb means a degree to which the degradation of the secondary battery 25 is facilitated at a selected value of the battery temperature Tb.

In the abscissa axis of FIG. 5, the value of the battery temperature Tb reduces, that is, the battery temperature Tb decreases, from the left toward the right in FIG. 5. As shown in FIG. 5, as the value of the battery temperature Tb reduces, that is, as the battery temperature Tb decreases, the rate of degradation DS of the secondary battery 25 decreases, and the secondary battery 25 becomes more difficult to degrade. On the other hand, as the value of the battery temperature Tb increases, that is, as the battery temperature Tb rises, the rate of degradation DS of the secondary battery 25 increases, and the secondary battery 25 becomes easier to degrade. When the graph of FIG. 5 is expressed by the mathematical expression, the rate of degradation DS is expressed by the following mathematical expression (1).

$$DS = \alpha \times \exp(\beta \times Tb) \qquad (1)$$

In the mathematical expression (1), $\alpha$ and $\beta$ are set in advance according to the type of the secondary battery 25. In the present embodiment, the rate of degradation DS at each value of the battery temperature Tb is prestored in the storage unit 61.

Figure 6:
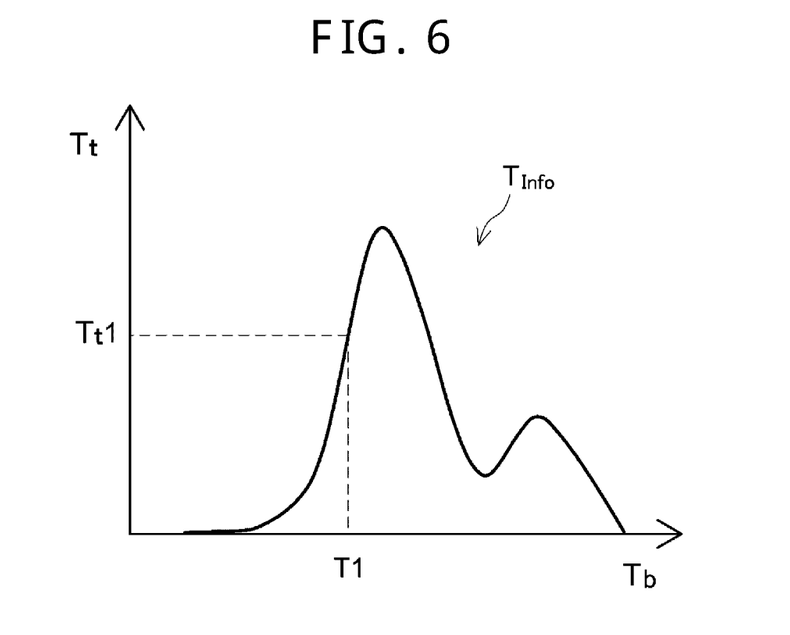
FIG. 6 is a graph that shows an example of integrated temperature information of a secondary battery.

FIG. 6 is a graph that shows the integrated temperature information TInfo of each secondary battery 25 (more specifically, each target battery 26). In FIG. 6, the ordinate axis represents integrated time Tt, and the abscissa axis represents battery temperature Tb. As shown in FIG. 6, integrated temperature information TInfo is information on durations at the values of the battery temperature Tb for each target battery 26. Here, integrated temperature information TInfo is information in which a total time (integrated time) during which the battery temperature Tb of the target battery 26 is a selected value is recorded temperature by temperature for each target battery 26 in a predetermined period. For example, in FIG. 6, an integrated time Tt when the value of the battery temperature Tb is T1 is Tt1.

The integrated temperature information TInfo is present for each of the target batteries 26 and is stored in the storage unit 61 (see FIG. 3). The integrated temperature information TInfo is, for example, updated when the detected battery temperature CTb of each target battery 26 is acquired in step S101. For example, an elapsed time from when the detected battery temperature CTb is acquired in step S101 is added to the integrated time Tt at the associated value of the battery temperature Tb in the integrated temperature information TInfo.

In step S105, the degradation amount D of the single target battery 26 is calculated as follows. The degradation amount calculation unit 74 initially calculates a degradation amount (hereinafter, referred to as temperature degradation amount) at each battery temperature Tb (each value of the battery temperature Tb). The degradation amount calculation unit 74 calculates a temperature degradation amount at each battery temperature Tb by multiplying the rate of degradation DS associated with the value of the battery temperature Tb by the integrated time Tt of the integrated temperature information TInfo. Where a temperature degradation amount is TS, TS is expressed by DS×Tt. Subsequently, the degradation amount calculation unit 74 calculates the degradation amount D of the single target battery 26 by adding all the temperature degradation amounts at the battery temperatures Tb for the single target battery 26. When the degradation amounts D of the other target batteries 26 are calculated with this procedure, the degradation amount D of each of the target batteries 26 is calculated. In step S105, the degradation amount D of each of the target batteries 26, calculated by the degradation amount calculation unit 74, is stored in the storage unit 61.

After the degradation amount D of each of the target batteries 26 is calculated in step S105 of FIG. 4, the degradation variations calculation unit 76 calculates degradation variations VD in the battery pack 20 in step S107. In the present embodiment, the degradation variations calculation unit 76 calculates degradation variations VD in the battery pack 20 based on the degradation amounts D of the target batteries 26. A method of calculating the degradation variations VD in the battery pack 20 is not limited. Here, the degradation variations calculation unit 76 defines a maximum difference in degradation amount D among the target batteries 26 as the degradation variations VD in the battery pack 20. In other words, the degradation variations calculation unit 76 defines a difference between the degradation amount D of the target battery 26 having the greatest degradation amount D and the degradation amount D of the target battery 26 having the least degradation amount D of the degradation amounts D of the target batteries 26 as the degradation variations VD in the battery pack 20.

Figure 7:
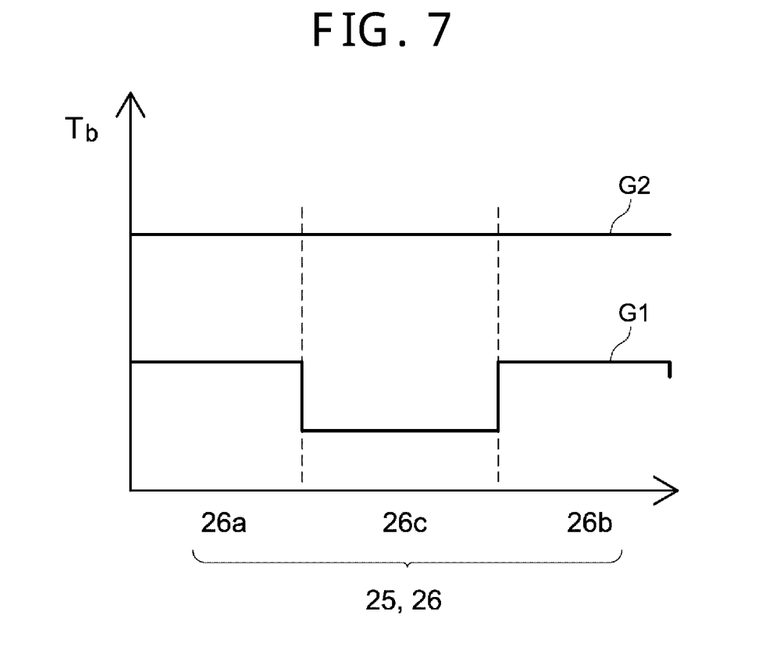
FIG. 7 is a graph that shows the relationship among target batteries that make up the battery pack and battery temperatures.

FIG. 7 is a graph that shows the relationship among the target batteries 26 that make up the battery pack 20 and battery temperatures Tb. As shown in FIG. 7, for example, of the target batteries 26, the target battery 26 located at one end portion of the battery pack 20, the target battery 26 located at the other end portion of the battery pack 20, and the target battery 26 located at the center portion of the battery pack 20 are respectively regarded as the target batteries 26a, 26b, 26c. In the present embodiment, when the degradation variations VD in the battery pack 20 are large, the battery temperatures Tb of the target batteries 26a, 26b located at both end portions of the battery pack 20 are high and the battery temperature Tb of the target battery 26c located at the center portion of the battery pack 20 is relatively low, as indicated by the graph line G1 in FIG. 7.

FIG. 5 demonstrates that the degradation amount D of the target battery 26 increases as the battery temperature Tb rises. Therefore, in the graph line G1, the degradation amounts D of the target batteries 26a, 26b located at both end portions of the battery pack 20 are large, and the degradation amount D of the target battery 26c located at the center portion of the battery pack 20 is relatively small. Therefore, in the present embodiment, the degradation variations VD in the battery pack 20 are indicated by a value obtained by subtracting the degradation amount D of the target battery 26c located at the center portion of the battery pack 20 from the degradation amount D of one of the target batteries 26a, 26b, located at any one of both end portions of the battery pack 20. In step S107, the degradation variations VD in the battery pack 20, calculated by the degradation variations calculation unit 76, are stored in the storage unit 61.

As described above, after step S101, step S103, step S105, and step S107 in FIG. 4, the first determination unit 81 determines in step S109 whether the detected battery temperature CTb acquired in step S101 is higher than the detected outside air temperature Tair acquired in step S103. The detected battery temperatures CTb of the three target batteries 26 are acquired in step S101. Therefore, in step S109, whether the detected battery temperature CTb is higher than the detected outside air temperature Tair means whether all the detected battery temperatures CTb of the three target batteries 26 are higher than the detected outside air temperature Tair. Alternatively, whether the detected battery temperature CTb is higher than the detected outside air temperature Tair may be whether the detected battery temperature CTb of at least one of the three target batteries 26 is higher than the detected outside air temperature Tair, or may be whether an average of the three detected battery temperatures CTb is higher than the detected outside air temperature Tair.

When the detected battery temperature CTb is higher than the outside air temperature Tair in step S109, the process proceeds to step S111. In step S111, the first air sending unit 85 causes the air sending device 30 to send outside air to the battery pack 20. More specifically, the first air sending unit 85 rotates the fan 37 by executing control to drive the motor 39 of the air sending device 30, as shown in FIG. 2. As a result, outside air introduced from the air inlet 31 is sent from the air outlet 32 toward the lower side of the battery pack 20.

In step S111, the battery temperatures Tb of the target batteries 26a, 26b, 26c are as shown in the graph line G2 of FIG. 7. In step S111, since the detected battery temperatures CTb are higher than the detected outside air temperature Tair, outside air cooler than the detected battery temperatures CTb is sent to the battery pack 20. Therefore, the secondary batteries 25 that make up the battery pack 20 are cooled. Because outside air cooler than the detected battery temperatures CTb relatively easily passes through the secondary batteries 25 located at the center portion of the battery pack 20, the secondary batteries 25 are relatively easily cooled. The secondary batteries 25 located near the air outlet 32 of the air sending device 30 in the battery pack 20 are too close to the air outlet 32, so outside air cooler than the detected battery temperatures CTb is difficult to pass through and is more difficult to be cooled than the secondary batteries 25 located at the center portion of the battery pack 20. Not only outside air cooler than the detected battery temperatures CTb but also warm air around the secondary batteries 25, and the like, located at the center portion of the battery pack 20 is sent to the secondary batteries 25 located near the exhaust air duct 40 in the battery pack 20, so the secondary batteries 25 located near the exhaust air duct 40 are relatively difficult to be cooled.

Therefore, when the secondary batteries 25 that make up the battery pack 20 are excessively cooled in step S111 of FIG. 4, there are concerns that degradation variations VD in the battery pack 20 increase. For this reason, in the present embodiment, an increase in the degradation variations VD in the battery pack 20 is suppressed by sending outside air higher in temperature than the detected battery temperatures CTb to the battery pack 20 in step S115 (described later).

Figure 8:
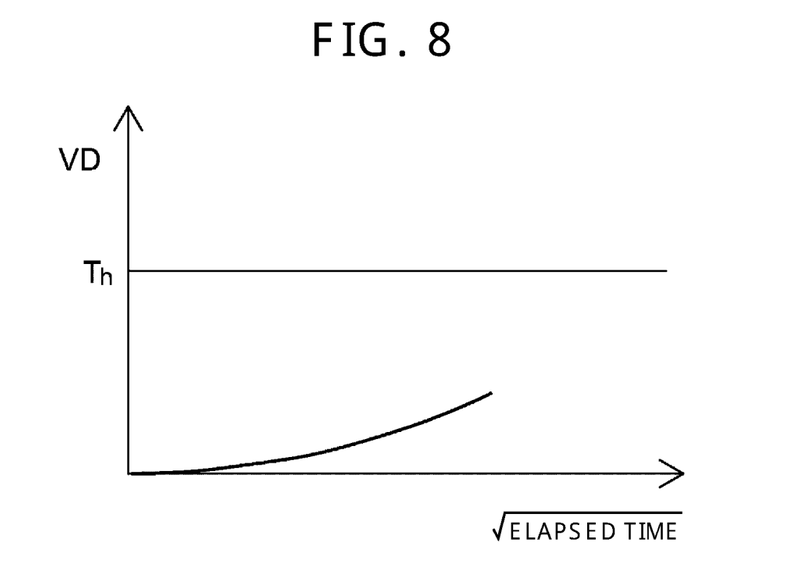
FIG. 8 is a graph that shows degradation variations in the battery pack with time.

When the detected battery temperatures CTb are lower than or equal to the detected outside air temperature Tair in step S109, the process proceeds to step S113. In step S113, the second determination unit 82 determines whether the degradation variations VD in the battery pack 20 are greater than or equal to a threshold Th. The threshold Th is a value for determining whether the degree of degradation variations VD is allowable and is preset for each vehicle 1. The threshold Th is prestored in the storage unit 61. FIG. 8 is a graph that shows degradation variations VD with time. In the graph of FIG. 8, the ordinate axis represents degradation variations VD in the battery pack 20, and the abscissa axis represents the square root of an elapsed time. As shown in FIG. 8, the threshold Th is constant regardless of an elapsed time. For example, when time elapses and the frequency of use of the battery pack 20 increases, degradation variations VD increase. In the graph of FIG. 8, a state where the degradation variations VD exceed the threshold Th is not shown; however, the degradation variations VD in the battery pack 20 can be greater than or equal to the threshold Th as an elapsed time extends.

When the second determination unit 82 determines in step S113 that the degradation variations VD in the battery pack 20 are greater than or equal to the threshold Th, the process proceeds to step S115. In step S115, the second air sending unit 86 causes the air sending device 30 to send outside air to the battery pack 20. More specifically, the second air sending unit 86 rotates the fan 37 by executing control to drive the motor 39 of the air sending device 30, as shown in FIG. 2. As a result, outside air introduced from the air inlet 31 is sent from the air outlet 32 toward the lower side of the battery pack 20.

In step S115 of FIG. 4, outside air is sent to the battery pack 20 as in the case of step S111; however, since the detected battery temperatures CTb are lower than or equal to the detected outside air temperature Tair, different from step S111, outside air warmer than the detected battery temperatures CTb is sent to the battery pack 20. Therefore, the secondary batteries 25 that make up the battery pack 20 are warmed. Outside air warmer than the detected battery temperatures CTb relatively easily passes through the secondary batteries 25 located at the center portion of the battery pack 20, and the secondary batteries 25 located at the center portion are relatively easily warmed as compared to the other secondary batteries 25. On the other hand, warm outside air is relatively difficult to be sent to the secondary batteries 25 located near the air outlet 32 of the air sending device 30 in the battery pack 20 and the secondary batteries 25 located near the exhaust air duct 40 in the battery pack 20, and the secondary batteries 25 located near the air outlet 32 and near the exhaust air duct 40 are relatively difficult to be warmed.

In the present embodiment, when the degradation variations VD in the battery pack 20 are large, the battery temperature Tb of the secondary battery 25 (that is, the target battery 26c) at the center portion of the battery pack 20 is low, and the battery temperatures Tb of the secondary batteries 25 (that is, the target batteries 26a, 26b) at both end portions of the battery pack 20 are high, as indicated by the graph line G1 of FIG. 7. As described above, when outside air having a temperature higher than the detected battery temperatures CTb is sent to the battery pack 20, the secondary battery 25 at the center portion of the battery pack 20 is more warmed, so temperature variations in the entire battery pack 20 reduce. As a result, as the temperature variations in the entire battery pack 20 reduce, the degradation variations VD in the battery pack 20 reduce.

When the second determination unit 82 determines in step S113 of FIG. 4 that the degradation variations VD in the battery pack 20 are less than the threshold Th, the process proceeds to step S117. In step S117, the air sending device 30 is not caused to send outside air to the battery pack 20, and outside air is not sent to the battery pack 20. This is because it is regarded that the degradation variations VD in the battery pack 20 are smaller than the threshold Th and allowable.

As described above, in the present embodiment, as shown in FIG. 2, the battery pack air cooling system 10 includes the battery pack 20, the air sending device 30, the battery temperature sensors 50, the outside air temperature sensor 55, and the controller 60. The battery pack 20 is made up of the assembled secondary batteries 25. The air sending device 30 has the air inlet 31 through which outside air is introduced, and sends the outside air introduced from the air inlet 31 to the battery pack 20. When at least part of the secondary batteries 25 are set as the target batteries 26, the battery temperature sensors 50 detect the battery temperatures Tb of the target batteries 26. The outside air temperature sensor 55 detects the outside air temperature Tair of outside air that is introduced into the air inlet 31.

As shown in FIG. 3, the controller 60 includes the storage unit 61, the battery temperature acquisition unit 71, the outside air temperature acquisition unit 72, the degradation amount calculation unit 74, the degradation variations calculation unit 76, the first determination unit 81, the second determination unit 82, the first air sending unit 85, and the second air sending unit 86. The storage unit 61 stores the integrated temperature information TInfo (see FIG. 6) having the integrated time Tt at each value of the battery temperature Tb for each target battery 26. The battery temperature acquisition unit 71 acquires the detected battery temperatures CTb that are the battery temperatures Tb of the target batteries 26 with the battery temperature sensors 50 (step S101 of FIG. 4). The outside air temperature acquisition unit 72 acquires the detected outside air temperature Tair that is the outside air temperature sensor Tair of outside air that is taken into the air inlet 31 with the outside air temperature sensor 55 (step S103 of FIG. 4). The degradation amount calculation unit 74 calculates the degradation amount D of each of the target batteries 26 based on the integrated temperature information TInfo (step S105 of FIG. 4). The degradation variations calculation unit 76 calculates the degradation variations VD in the battery pack 20 based on the degradation amount D of each of the target batteries 26, calculated by the degradation amount calculation unit 74 (step S107 of FIG. 4). The first determination unit 81 determines whether the detected battery temperatures CTb are higher than the detected outside air temperature Tair (step S109 of FIG. 4). The second determination unit 82 determines whether the degradation variations VD in the battery pack 20, calculated by the degradation variations calculation unit 76, are greater than or equal to the predetermined threshold Th (step S113 of FIG. 4). When the first determination unit 81 determines that the detected battery temperatures CTb are higher than the detected outside air temperature Tair, the first air sending unit 85 causes the air sending device 30 to send outside air to the battery pack 20 (step S111 of FIG. 4). When the first determination unit 81 determines that the detected battery temperatures CTb are lower than or equal to the detected outside air temperature Tair and the second determination unit 82 determines that the degradation variations VD in the battery pack 20 are greater than or equal to the threshold Th, the second air sending unit 86 causes the air sending device 30 to send outside air to the battery pack 20 (step S115 of FIG. 4).

According to the present embodiment, the degradation amount D is calculated based on the integrated temperature information TInfo that is information about the battery temperature Tb in the past for each of the target batteries 26 of the secondary batteries 25 that make up the battery pack 20, and the degradation variations VD in the battery pack 20 are calculated from the degradation amounts D of the target batteries 26. When it is determined that the detected battery temperatures CTb are lower than or equal to the detected outside air temperature Tair and it is determined that the degradation variations VD in the battery pack 20 are greater than or equal to the threshold Th (step S115 of FIG. 4), outside air warmer than the detected battery temperatures CTb is sent to the battery pack 20. When the degradation variations VD in the battery pack 20 are large, the battery temperature Tb of the target battery 26c at the center portion of the battery pack 20 is low and the battery temperatures Tb of the target batteries 26a, 26b at both end portions of the battery pack 20 are high, as indicated by the graph line G1 of FIG. 7. When outside air having a temperature higher than the detected battery temperatures CTb is sent to the battery pack 20, a rate of increase in the battery temperature Tb of the secondary battery 25 located at the center portion of the battery pack 20 is smaller than a rate of increase in the battery temperature Tb of each of secondary batteries 25 located at both end portions of the battery pack 20. Thus, a difference in battery temperature Tb among the secondary batteries 25 that make up the battery pack 20 reduces, and a difference in degradation amount D reduces. As a result, a difference in degradation amount D among the secondary batteries 25 can be reduced to within the allowable range of the degradation amount D, so the degradation variations VD in the battery pack 20 are suppressed.

In the present embodiment, the storage unit 61 prestores the rate of degradation DS at each value of the battery temperature Tb (see FIG. 5). The degradation amount calculation unit 74 calculates a temperature degradation amount at each value of the battery temperature Tb for each target battery 26 by multiplying the rate of degradation DS by the integrated time Tt at the value of the battery temperature Tb. The degradation amount calculation unit 74 determines a value obtained by adding the temperature degradation amounts at the values of the battery temperature Tb for each target battery 26 as the degradation amount D of each target battery 26. Here, a rate of degradation DS means a degree to which the degradation of the secondary battery 25 is facilitated at a selected battery temperature Tb. As the battery temperature Tb rises, the rate of degradation DS increases, and the associated secondary battery 25 becomes easier to degrade. In the present embodiment, as shown in FIG. 6, from the distribution of the battery temperature Tb of the target battery 26 with time, a temperature degradation amount at each battery temperature Tb can be calculated. The degradation amount D can be calculated for each target battery 26 by adding those temperature degradation amounts. Therefore, by using the rate of degradation DS, the degradation amount D based on the battery temperature Tb is easily calculated.

In the present embodiment, the degradation variations calculation unit 76 defines a difference between the degradation amount D of the target battery 26 having the greatest degradation amount D and the degradation amount D of the target battery 26 having the least degradation amount D of the degradation amounts D of the target batteries 26, calculated by the degradation amount calculation unit 74, as the degradation variations VD in the battery pack 20. The degradation variations VD in the battery pack 20 may be, in other words, a difference in degradation amount D among the secondary batteries 25 that make up the battery pack 20. Therefore, when a difference between the degradation amount D of the target battery 26 having the greatest degradation amount D and the degradation amount D of the target battery 26 having the least degradation amount D is defined as the degradation variations VD, the degradation variations VD in the battery pack 20 can be easily calculated.

In the present embodiment, as shown in FIG. 2, the target batteries 26 are the secondary batteries 25 located at both end portions of the battery pack 20 and the secondary battery 25 located at the center portion of the battery pack 20. When the degradation variations VD in the battery pack 20 are large, it is presumable that, as shown in FIG. 7, the secondary batteries 25 located at both end portions of the battery pack 20 (in other words, the target batteries 26a, 26b) are higher in temperature and greater in degradation amount D than the secondary battery 25 located at the center portion of the battery pack 20 (in other words, the target battery 26c). Therefore, when the degradation amount D and the degradation variations VD are calculated based on the target batteries 26 located at the above-described three portions, the degradation amount D and the degradation variations VD in the battery pack 20 can be calculated while a calculation amount is reduced.

In the present embodiment, as shown in FIG. 1, the vehicle 1 includes the battery pack air cooling system 10 described above. Thus, the vehicle 1 that is able to suppress degradation variations VD in the battery pack 20 is provided.

The vehicle 1 including the battery pack air cooling system 10 according to the first embodiment is described. Next, a battery pack air cooling system 10A according to a second embodiment will be described. In the second embodiment, like reference signs denote members and portions that have the same operations as those of the first embodiment, and the description thereof will not be repeated or simplified as needed.

Second Embodiment

Figure 9:
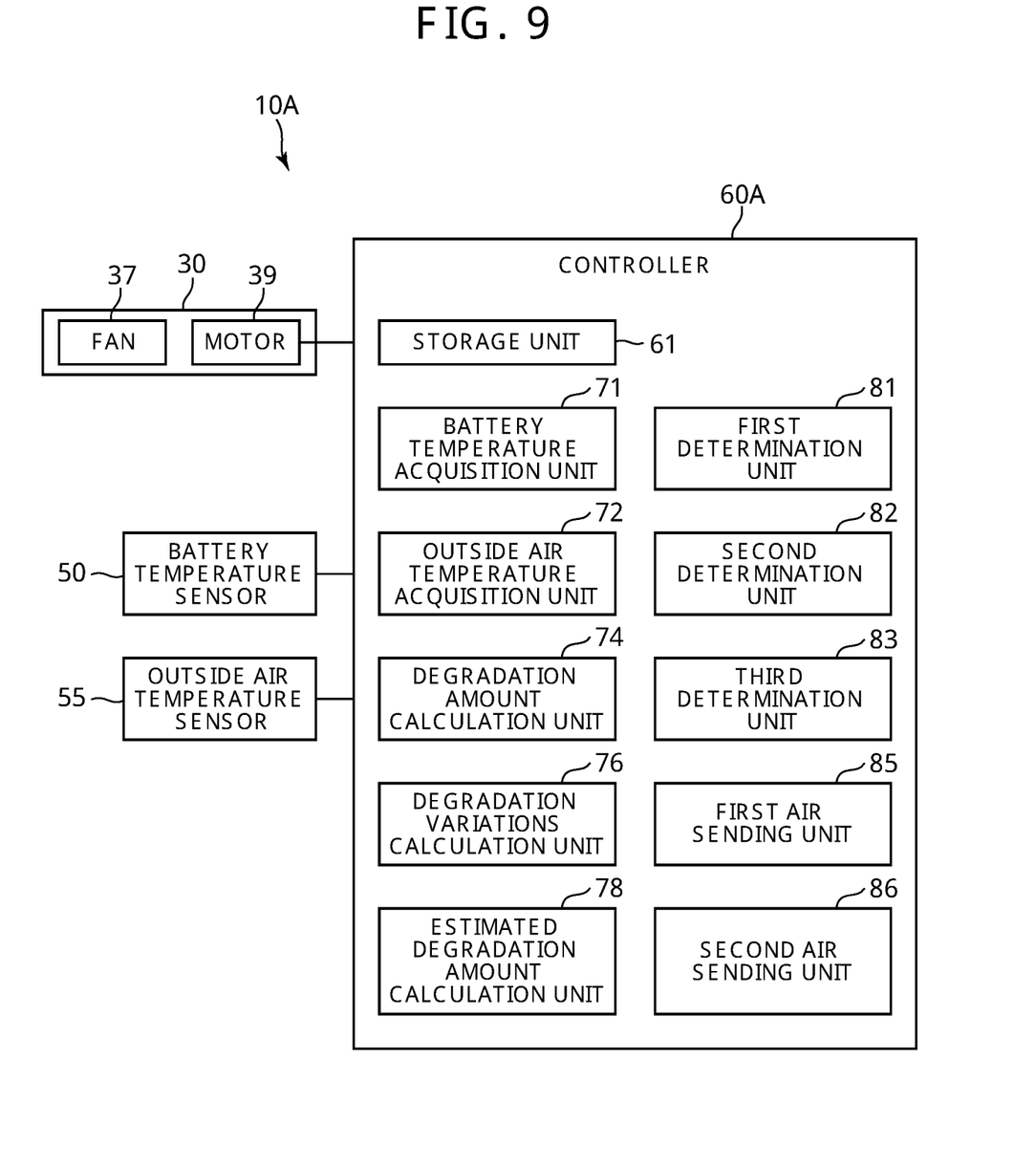
FIG. 9 is a block diagram of a battery pack air cooling system according to a second embodiment.

The configuration of the battery pack air cooling system 10A according to the second embodiment is the same as the configuration of the battery pack air cooling system 10 according to the first embodiment, and, as shown in FIG. 2, the battery pack air cooling system 10A includes the air sending device 30, the battery temperature sensors 50, the outside air temperature sensor 55, and a controller 60A (see FIG. 9).

FIG. 9 is a block diagram of the battery pack air cooling system 10A according to the second embodiment. As shown in FIG. 9, the controller 60A, as well as the controller 60 according to the first embodiment, includes the storage unit 61, the battery temperature acquisition unit 71, the outside air temperature acquisition unit 72, the degradation amount calculation unit 74, the degradation variations calculation unit 76, the first determination unit 81, the second determination unit 82, the first air sending unit 85, and the second air sending unit 86. In the present embodiment, the controller 60A further includes an estimated degradation amount calculation unit 78 and a third determination unit 83.

Figure 10:
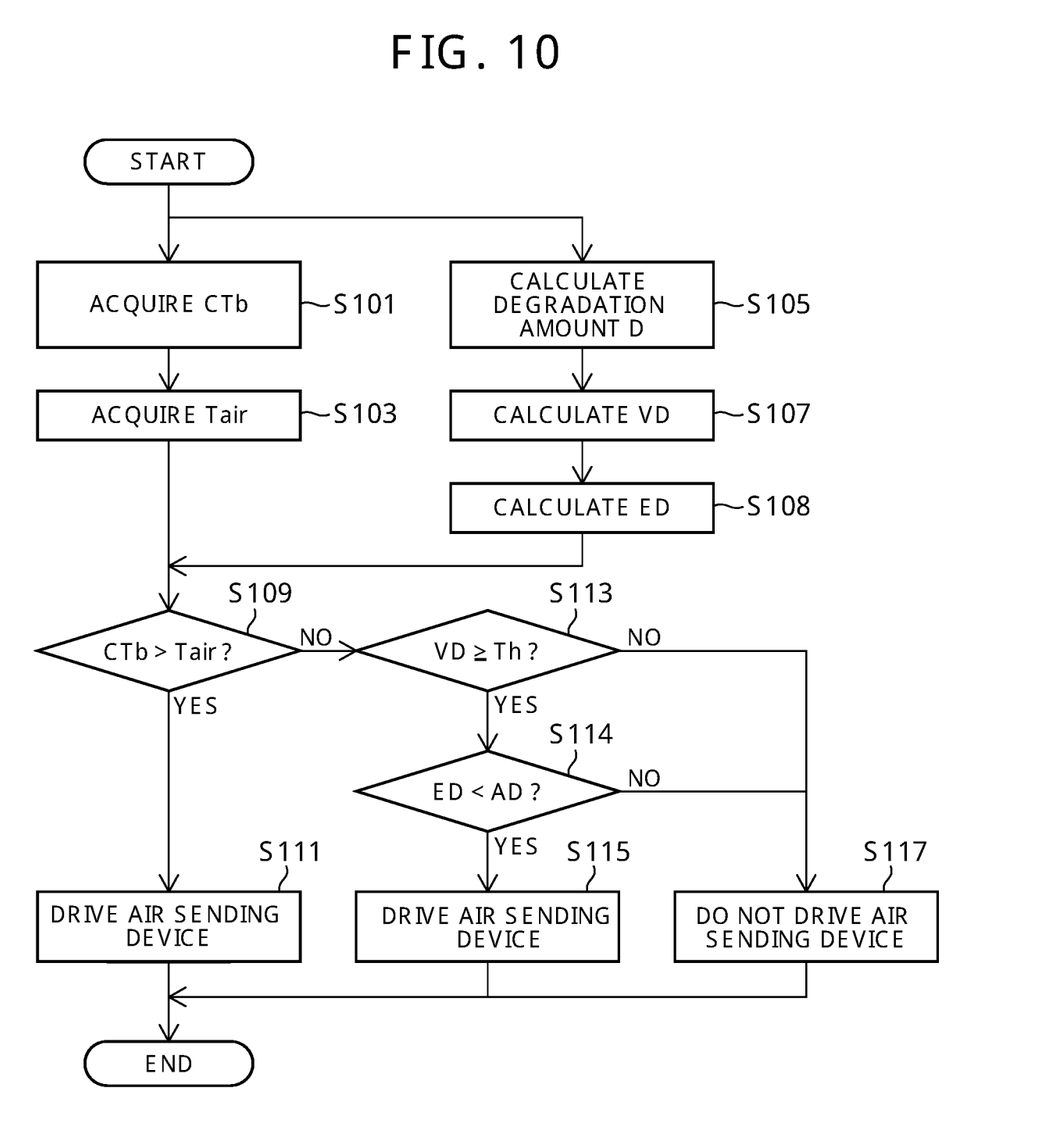
FIG. 10 is a flowchart that shows a procedure for sending outside air to a battery pack in the second embodiment.

Next, a procedure for sending outside air to the battery pack 20 by the battery pack air cooling system 10A according to the present embodiment will be described with reference to the flowchart of FIG. 10. The flowchart of FIG. 10 is a flowchart obtained by adding step S108 and step S114 to the flowchart of FIG. 4 in the first embodiment. In the present embodiment, step S101, step S103, step S105, step S107, step S109, step S111, step S113, step S115, and step S117 are the same as those of the first embodiment, so the description thereof is omitted.

In the present embodiment, after the degradation variations VD in the battery pack 20 are calculated in step S107 of FIG. 10, the estimated degradation amount calculation unit 78 calculates an estimated degradation amount ED for each target battery 26 in step S108. An estimated degradation amount ED is the degradation amount of the target battery 26 when outside air is sent to the battery pack 20 during a lapse of a predetermined time from a current time point. Here, the estimated degradation amount ED can be calculated by adding the degradation amount D of the target battery 26 up to the current time point and an estimated amount of increase in degradation amount (hereinafter, degradation facilitation amount PD) in the case where outside air is sent to the battery pack 20 during a lapse of the predetermined time from the current time point.

In the present embodiment, the degradation facilitation amount PD is calculated as follows. The estimated degradation amount calculation unit 78 calculates the degradation facilitation amount PD from the mathematical expression (1) expressing the graph of FIG. 5 based on the detected outside air temperature Tair calculated in step S103, and an outside air introduction time. For example, by substituting the detected outside air temperature Tair into T in the mathematical expression (1), the rate of degradation DS at the detected outside air temperature Tair is calculated. The estimated degradation amount calculation unit 78 calculates a degradation facilitation amount PD by multiplying the rate of degradation DS at the detected outside air temperature Tair by the outside air introduction time.

Here, the outside air introduction time is a time during which outside air is sent to the battery pack 20. For example, the process of the flowchart of FIG. 10 is started when an interrupt process is executed each time a predetermined time elapses. Therefore, for example, the outside air introduction time is the predetermined time and is an interval at which the interrupt process is executed.

In this way, after the degradation facilitation amount PD is calculated for each target battery 26, the estimated degradation amount calculation unit 78 calculates an estimated degradation amount ED for each target battery 26 by adding the degradation amount D of the target battery 26 and the degradation facilitation amount PD.

Figure 11:
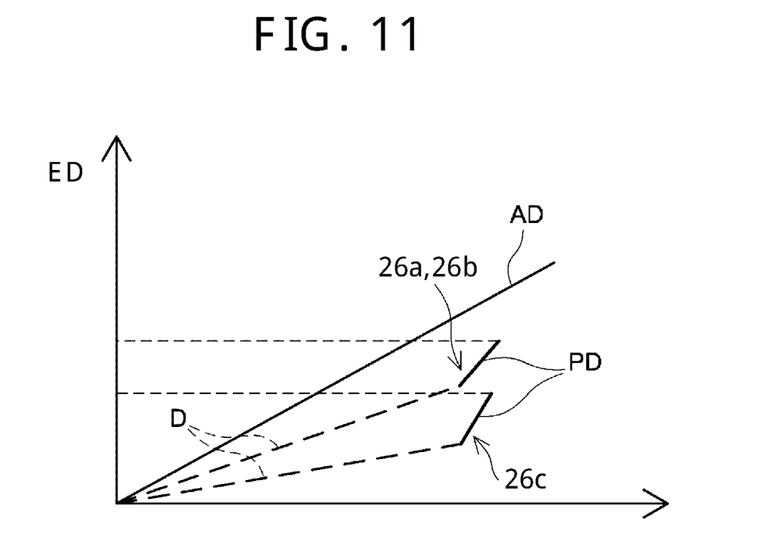
FIG. 11 is a graph that shows estimated degradation amounts of target batteries that make up the battery pack.

The relationship among a degradation amount D, a degradation facilitation amount PD, and an estimated degradation amount ED for each target battery 26 is as shown in the graph of FIG. 11. FIG. 11 is a graph that shows estimated degradation amounts of the target batteries 26a, 26b, 26c. In the graph of FIG. 11, the ordinate axis represents estimated degradation amount ED, and the abscissa axis represents the square root of an elapsed time. In this way, the estimated degradation amount calculation unit 78 calculates an estimated degradation amount ED of each target battery 26.

As shown in FIG. 10, in the present embodiment, after the first determination unit 81 determines in step S109 that the detected battery temperatures CTb are lower than or equal to the detected outside air temperature Tair and the second determination unit 82 determines in step S113 that the degradation variations VD in the battery pack 20 are greater than or equal to the threshold Th, the process proceeds to step S114. In step S114, the third determination unit 83 determines in step S108 whether the calculated estimated degradation amount ED of each target battery 26 is less than an assumed degradation amount AD.

The assumed degradation amount AD is an allowable amount of the estimated degradation amount ED when outside air is sent to the battery pack 20 during a lapse of a predetermined time (that is, the outside air introduction time) from the current time point. If the estimated degradation amount ED is greater than or equal to the assumed degradation amount AD, when warm outside air is sent to the battery pack 20 during a lapse of the predetermined time, the degradation of the secondary battery 25 is estimated to advance more than an allowable amount. In this case, it is desirable that outside air be not sent to the battery pack 20. On the other hand, when the estimated degradation amount ED is less than the assumed degradation amount AD, it is estimated that the degradation amount of the secondary battery 25 does not exceed the assumed degradation amount AD even when warm outside air is continuously sent to the battery pack 20 during a lapse of the predetermined time. In this case, warm outside air may be sent to the battery pack 20.

The value of the assumed degradation amount AD varies depending on an elapsed time (in other words, outside air introduction time) as shown in FIG. 11. The assumed degradation amount AD is preset according to the type, or the like, of the secondary battery 25 and prestored in the storage unit 61.

In the present embodiment, in step S114, whether the estimated degradation amount ED is less than the assumed degradation amount AD means whether all the estimated degradation amounts ED of the three target batteries 26 are less than the assumed degradation amount AD. Alternatively, whether the estimated degradation amount ED is less than the assumed degradation amount AD may mean whether the estimated degradation amount ED of at least one of the three target batteries 26 is less than the assumed degradation amount AD or may mean whether an average of the estimated degradation amounts ED of the three target batteries 26 is less than the assumed degradation amount AD.

In the present embodiment, when the third determination unit 83 determines in step S114 that the estimated degradation amount ED of each target battery 26 is less than the assumed degradation amount AD, the process proceeds to step S115. In step S115, the second air sending unit 86 causes the air sending device 30 to send outside air to the battery pack 20. In step S115, since the detected battery temperatures CTb are lower than or equal to the detected outside air temperature Tair, outside air warmer than the detected battery temperatures CTb is sent to the battery pack 20. Therefore, the secondary batteries 25 that make up the battery pack 20 are warmed.

On the other hand, when the third determination unit 83 determines in step S114 that the estimated degradation amount ED of each target battery 26 is greater than or equal to the assumed degradation amount AD, the process proceeds to step S117. In step S117, the air sending device 30 is not caused to send outside air to the battery pack 20, and outside air is not sent to the battery pack 20.

In the present embodiment, an increase in the degradation amount of each target battery 26 in the case where outside air is sent to the battery pack 20 during a lapse of the predetermined time from the current time point is defined as the degradation facilitation amount PD. The controller 60 includes the estimated degradation amount calculation unit 78 and the third determination unit 83. The estimated degradation amount calculation unit 78 calculates for each target battery 26 an estimated degradation amount ED obtained by adding the degradation amount D of the target battery 26, calculated by the degradation amount calculation unit 74, and the degradation facilitation amount PD (step S108 of FIG. 10). The third determination unit 83 determines whether the estimated degradation amount ED of each target battery 26, calculated by the estimated degradation amount calculation unit 78, is less than the predetermined assumed degradation amount AD (step S114 of FIG. 10). When it is determined that the detected battery temperatures CTb are lower than or equal to the detected outside air temperature Tair (step S109 of FIG. 10), it is determined that the degradation variations VD in the battery pack 20 are greater than or equal to the threshold Th (step S113 of FIG. 10), and it is determined that the estimated degradation amount ED of each target battery 26 is less than the assumed degradation amount AD (step S114 of FIG. 10), the second air sending unit 86 causes the air sending device 30 to send outside air to the battery pack 20 (step S115 of FIG. 10). As a result, when the estimated degradation amount ED of each target battery 26 is less than the assumed degradation amount AD, it is estimated that the degradation amount of the secondary battery 25 does not exceed the assumed degradation amount AD even when warm outside air is continuously sent to the battery pack 20 during a lapse of the predetermined time. Thus, in this case, a difference in degradation amount D among the secondary batteries 25 can be reduced within the allowable range of the degradation amount, so the degradation variations VD in the battery pack 20 are suppressed.

In the present embodiment, the estimated degradation amount calculation unit 78 calculates a degradation facilitation amount PD based on the rate of degradation DS at each value of the battery temperature Tb (see FIG. 5) and the detected outside air temperature Tair (step S103 of FIG. 10). By using the rate of degradation DS in this way, a degradation facilitation amount PD at the time when outside air of the detected outside air temperature Tair is sent to the battery pack 20 during a lapse of the predetermined time is easily calculated. Therefore, an estimated degradation amount ED of each target battery 26 is easily calculated.

What is claimed is:

1. A battery pack air cooling system comprising:
a battery pack made up of a plurality of assembled secondary batteries;
an air sending device having an air inlet through which outside air is introduced, the air sending device being configured to send outside air, introduced through the air inlet, to the battery pack;
a battery temperature sensor configured to, when at least part of the plurality of secondary batteries is set as target batteries, detect a battery temperature of each target battery;
an outside air temperature sensor configured to detect an outside air temperature of outside air that is introduced into the air inlet;
a controller, comprising:
a memory configured to store integrated temperature information having an integrated time at each value of the battery temperature for each target battery; and
a processor programmed to
acquire a detected battery temperature that is the battery temperature of each target battery with the battery temperature sensor;
acquire a detected outside air temperature that is the outside air temperature of outside air that is introduced into the air inlet with the outside air temperature sensor;
calculate a degradation amount of each target battery based on the integrated temperature information;
calculate degradation variations in the battery pack based on the degradation amount calculated for each target battery;
determine whether the detected battery temperature is higher than the detected outside air temperature;
determine whether the degradation variations in the battery pack are greater than or equal to a predetermined threshold;
when the detected battery temperature is higher than the detected outside air temperature, cause the air sending device to send outside air to the battery pack; and
when the detected battery temperature is lower than or equal to the detected outside air temperature and the degradation variations in the battery pack are greater than or equal to the threshold, cause the air sending device to send outside air to the battery pack.

2. The battery pack air cooling system according to claim 1, wherein:
the memory is configured to prestore a rate of degradation at each value of the battery temperature;
the processor is programmed to calculate a temperature degradation amount at each value of the battery temperature for each target battery by multiplying the rate of degradation by the integrated time at each value of the battery temperature; and
the processor is programmed to determine a value obtained by adding the temperature degradation amounts at the values of the battery temperature for each target battery as the degradation amount of each target battery.

3. The battery pack air cooling system according to claim 2, wherein:
the processor is programmed to
where an amount of increase in degradation amount of each target battery where outside air is sent to the battery pack during a lapse of a predetermined time from a current time point is a degradation facilitation amount, calculate an estimated degradation amount obtained by adding the degradation amount of each target battery and the degradation facilitation amount for each target battery; and
determine whether the estimated degradation amount of each target battery is less than a predetermined assumed degradation amount; and
when the processor determines that the detected battery temperature is lower than or equal to the detected outside air temperature, the processor determines that the degradation variations in the battery pack are greater than or equal to the threshold, and the processor determines that the estimated degradation amount of each target battery is less than the assumed degradation amount, cause the air sending device to send outside air to the battery pack.

4. The battery pack air cooling system according to claim 3, wherein the processor is programmed to calculate the degradation facilitation amount of each target battery based on the rate of degradation at each value of the battery temperature, and the detected outside air temperature.

5. The battery pack air cooling system according to claim 1, wherein processor is programmed to define a difference between the degradation amount of the target battery having the greatest degradation amount and the degradation amount of the target battery having the least degradation amount of the degradation amounts of the target batteries as the degradation variations in the battery pack.

6. The battery pack air cooling system according to claim 1, wherein the target batteries include the secondary battery located at each of both end portions of the battery pack and the secondary battery located at a center portion of the battery pack.

7. A vehicle comprising the battery pack air cooling system according to claim 1.

* * * * *